United States Patent
Sirami et al.

(10) Patent No.: US 7,090,881 B2
(45) Date of Patent: Aug. 15, 2006

(54) METHOD OF CONTINUOUS PRODUCTION OF DRIED, GROUND MEAT RECONSTITUTED AS THIN SLABS

(75) Inventors: Jean Sirami, La Roche Blanche (FR); Pascal Lhoutellier, Ceyrat (FR)

(73) Assignee: Adiv Development, Clermont Ferrand (FR)

( * ) Notice: Subject to any disclaimer, the term of this patent is extended or adjusted under 35 U.S.C. 154(b) by 90 days.

(21) Appl. No.: 10/756,735

(22) Filed: Jan. 13, 2004

(65) Prior Publication Data

US 2004/0146631 A1 Jul. 29, 2004

Related U.S. Application Data

(63) Continuation of application No. PCT/FR02/02274, filed on Jan. 7, 2002.

(30) Foreign Application Priority Data

Jul. 13, 2001 (FR) .................................. 01/09564

(51) Int. Cl.
*A23L 1/317* (2006.01)
(52) U.S. Cl. ...................... 426/264; 426/513; 426/516; 426/646
(58) Field of Classification Search ................ 426/646, 426/513, 264, 516, 410, 414
See application file for complete search history.

(56) References Cited

U.S. PATENT DOCUMENTS

| | | | |
|---|---|---|---|
| 3,500,743 A | 3/1970 | Cameron | ...................... 99/353 |
| 3,914,444 A | 10/1975 | Svacik | ........................ 426/284 |
| 4,665,811 A | 5/1987 | Meyer | ........................... 99/455 |
| 4,852,477 A | 8/1989 | Schubring et al. | ......... 99/450.2 |
| 4,910,034 A | 3/1990 | Winkler | ....................... 426/420 |
| 5,811,146 A * | 9/1998 | Marra et al. | ................ 426/513 |
| 5,843,504 A | 12/1998 | Kobussen et al. | .......... 426/277 |
| 5,989,609 A * | 11/1999 | Kobussen et al. | .......... 426/277 |
| 6,254,911 B1 * | 7/2001 | Komatsu | .................... 426/393 |
| 6,649,206 B1 * | 11/2003 | Dingman et al. | ........... 426/513 |

FOREIGN PATENT DOCUMENTS

GB 2149639 6/1985

* cited by examiner

*Primary Examiner*—Arthur L. Corbin
(74) *Attorney, Agent, or Firm*—Heslin Rothenberg Farley & Mesiti P.C.

(57) ABSTRACT

The invention concerns a method comprising the following steps: chopping up more or less noble meat, in a chopper; at the output of the chopper conveying the minced meat into a meat pump, continuously presented in the form of a tube or a continuous flattened strip; unwinding a film capable of forming a scaling sheath around the continuous tube or strip of minced meat; passing the sheathed minced meat tube or strip in a rolling device for spreading the minced meat into a strip configuration in a thin layer, in a compacting and texturing configuration not revealing the meat parts themselves; continuously unwinding in a dehydrating solution bath; curing the drawn minced meat strip at the output of the bath removing the sheath-forming film; and conveying the thin rolled minced meat strip to a cutting and packaging station.

7 Claims, 2 Drawing Sheets

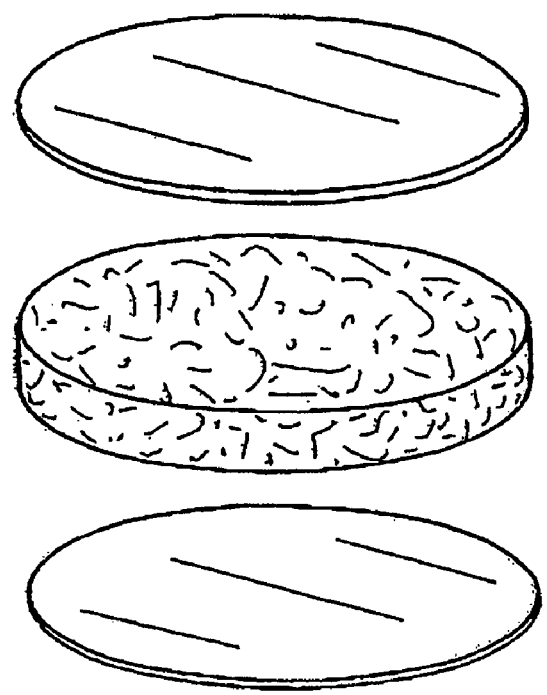
FIG.1
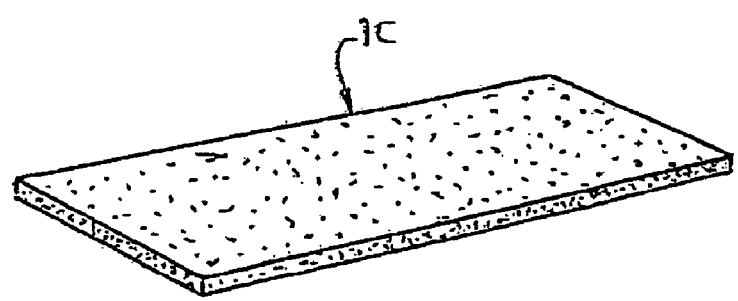
FIG.2
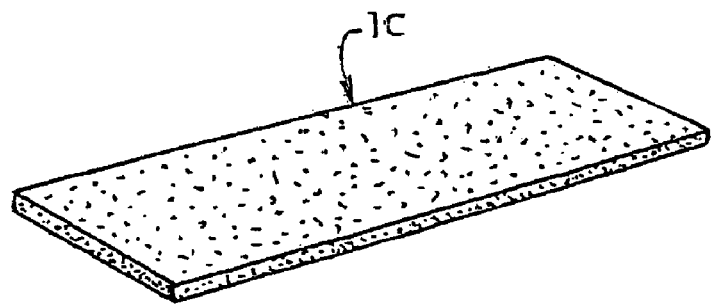

METHOD OF CONTINUOUS PRODUCTION OF DRIED, GROUND MEAT RECONSTITUTED AS THIN SLABS

CROSS REFERENCE TO RELATED APPLICATIONS

This application is a continuation of PCT application PCT/FR02/02274 filed Jan. 7, 2002 designating the United States, and published in French as WO 03/007722 on Jan. 30, 2003, and claims priority of French application FR 01/09564 filed Jul. 13, 2001. The entire disclosures of both are incorporated herein by reference.

The invention relates to the technical sector of the meat industry and to the conversion and packaging of meat.

The marketing of ground meat is highly developed within the various selling networks, retail butchers' or supermarkets. This ground meat is generally formed by products of lesser quality than meat products sold as cuts.

Ground meat in the form of burgers is packaged by placing said meat in a mixer and presser in order to shape it into a thick, parallelepipedal configuration.

The ground-meat burger obtained may, in terms of presentation, be placed between two plastic or paper films that have previously been cut to the shape of said burger. The appearance of the meat suggests an agglomeration of pieces of ground meat that have been compacted by the shaping apparatus.

This presentation thus has its limits.

Furthermore, in the field of cured and dried meats, such as dried hams, cushions of ham, and viandes des Grisons, it is common for it to be presented as slices, thus allowing packaging, in trays, of several slices of the product in question. This thus allows the purchaser to consume the product in accordance with his/her requirements. The sliced presentation of products such as sausages or salamis is also known.

These products are produced by means of a highly conventional technique consisting of drying by entraining air over large pieces, be these hams or whole legs (case of dried meats), or ground meat re-formed as pieces of fairly large volume, in casings (case of dried sausages, salamis, etc.). Air-drying times are lengthy, being between six weeks (salamis, dried sausages) and six to nine months in the case of dried ham.

Packaging in the form of slices then takes place under the conditions mentioned above.

According to the prior art, it is thus not possible to package ground meat in the form of thin slices with a view to presentation in trays because the pieces of ground meat have no consistency and have undergone no preservation.

Also known is a technology for presenting meat food products that applies to salmon, which allows presentation in the form of slices. This technique is described in patents FR 2 693 351 and EP 587 515. This consists of a method for salting, drying and smoking products that have been prepared and cut into fillets beforehand. After salting and drying, the products are exposed to a stream of smoke in a smoking chamber. An impregnation-drying operation is simultaneously carried out by placing the fillet-form products in contact with a sodium-chloride and sugar mixture.

This technology cannot be adapted to the processing of ground meat, which cannot be cut into slices prior to processing in a brine bath.

The applicant's approach was thus to seek a new concept for processing ground meat that allows thin slices to be obtained with a view to the latter's presentation for sale in trays.

The applicant thus developed, after various tests and trials of and investigations into solutions, a novel method offering substantial points of interest and advantages in terms of productivity and in terms of product presentation.

The method according to the invention is noteworthy in that it employs the following stages, using ground meat, to continuously obtain ground cured and dried meat that is reconstituted as thin slabs:

the first stage consists in fine chopping-up of more or less noble meat, in a chopper or mixer;

the second stage consists, at the output of the chopper, in conveying the ground meat into a meat pump, guaranteeing continuous presentation in the form of a tube or a continuous flattened strip;

the third stage consists in unwinding a film in the form of one or more parts that is capable of forming a sealing sheath around the continuous tube or strip of ground meat;

the fourth stage consists in passing said sheathed ground-meat tube or strip into a rolling device for spreading the ground meat into a strip configuration, in a thin layer, in a compacting and texturing configuration that does not reveal the meat parts themselves;

the fifth stage consists in continuously unwinding the drawn ground-meat strip in a dehydrating-/curing-solution bath;

the sixth stage consists, at the output of the solution bath, in removing the sheath-forming film;

the seventh stage consists in conveying the thin, dried and rolled, ground-meat strip to a cutting and packaging station.

According to another characteristic of the invention, the method can allow, before or after fine chopping-up of the meats, spices and other food-grade components to be added, the whole then being mixed and processed in accordance with the method in the successive stages.

According to another characteristic of the invention, the method is implemented in an installation that includes a chopping and mixing apparatus with a feed hopper, receiving finally a meat pump for forming the ground, mixed meat into a tube, a system for dispensing and feeding a film in the form of one or more parts that form a sealing sheath for surrounding the ground-meat tube or strip, a rolling device placed downstream of said film-dispensing system, a dehydrating-/curing-solution bath receiving a mechanical device for conveying the rolled ground-meat tube or strip, a device for cutting and separating the sheath-forming film downstream of the dehydrating/curing bath, a device for cutting and packaging the processed ground meat in the form of thin slices.

These and yet other characteristics will become clearly apparent from the remainder of the description.

In order to establish the subject of the invention illustrated in a non-limiting manner in the figures of the drawings, in which:

FIG. 1 is a view of a ground burger presentation according to the prior art, at the time of sale;

FIG. 2 is a view of a ground burger presentation in the form of thin slices, in trays, obtained according to the invention;

Figure 3:
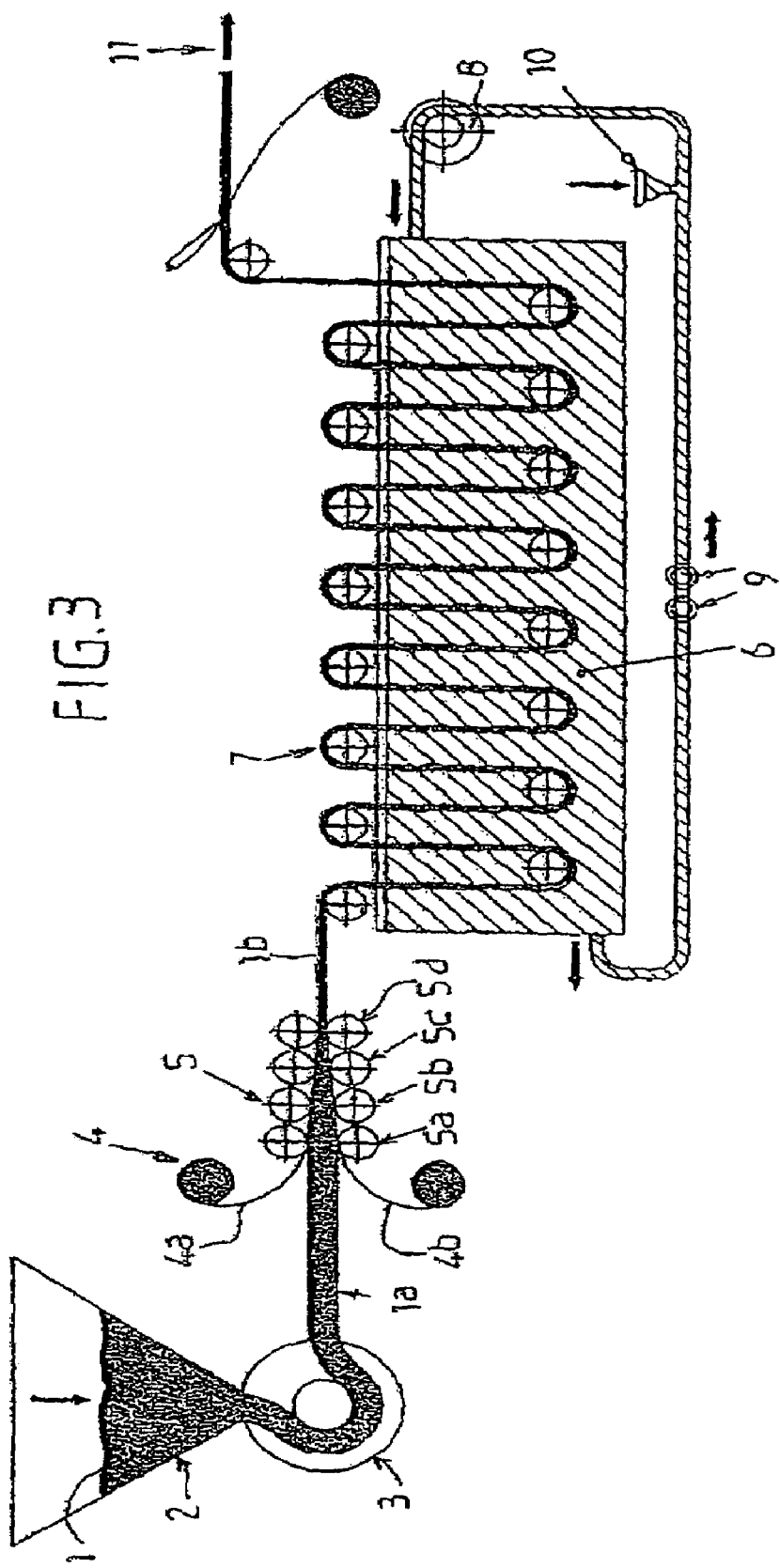
FIG. 3 is a diagrammatic view illustrating the installation for implementing the method according to the invention.

In order to make the subject of the invention more concrete, it is now described in a non-limiting manner, illustrated by means of the figures in the drawings.

The installation for continuous production of cured and dried ground meat reconstituted as thin slabs comprises, from upstream to downstream, the following various means, which are shown in FIG. 3.

The processed ground meat is referenced overall by (1) and use will be made of sub-references as a function of the various processing and implementation stages of the method, with reference to its shape.

The installation comprises a chopper/mixer apparatus— not shown in the FIG. 3—then a hopper (2) for receiving more or less noble ground meat in the raw state. The apparatus may receive either only ground meat in the raw state or, in addition, supplementary food products such as spices and other ingredients that may contribute nutritional or sensory qualities to the final product. At the output, said apparatus (2) has a meat pump (3) for continuous feeding of the ground meat, in an already flattened strip or tubular presentation, with a view to continuous advance. The ground meat is thus in a tubular configuration (1a) or a flattened configuration during a production stage. Downstream is a device (4) for dispensing films for forming a sheath. This film may be produced in two parts (4a–4b), with an upper film (4a) and a lower film (4b), as shown in the drawings, for surrounding or enclosing the tube or strip of ground meat in the above-mentioned state. The films are bonded or sealed to one another in any appropriate manner to form the sheath. As a variant, there may be a single film that is folded back on itself around the continuous tube or strip of ground meat. This film or these films are wound as reels on supports placed on either side of the direction of advance of the tube of ground meat in the case of a sheath in two initial parts, or using a single reel with a device for folding the film in order to surround the tube or strip of meat. A continuous automated system is envisaged, allowing unwinding of the films (4a–4b) at a speed defined as a function of the meat-processing conditions. The tube of ground meat enclosed and protected by the films is then conveyed to a rolling device (5), that may be horizontal or vertical, comprising several pairs of rolling rollers (5a–5b–5c–5d), for progressively crushing the ground meat and drawing it out into a thin layer. Consequently, upon exiting rolling, the ground meat is enclosed in the protective films (4a–4b) in a flattened state in a continuous compact, thin strip (1b), revealing no granules of ground meat, giving the appearance of a continuous and firm texture.

Downstream from rolling, the continuous strip (1b) of drawn, rolled ground meat is placed in a dehydrating-/curing-solution bath (6), the length of which is determined by the immersion time required for the meat-dehydrating-/curing effect. The dehydrating-/curing-solution bath includes a roller-type continuous conveying device (7) for conveying the strip of meat into the bath for a measured period of time. The upper and lower films enclosing the rolled ground meat are chosen to meet various criteria, taking account of the conditions of the method of the invention.

This film or these films must firstly be immune to damage during the period of steeping in the dehydrating-/curing-solution bath. They must also allow, by means of diffusion, the desired effect of curing of the meat throughout its volume and thickness and, more generally, the characteristics imparted to it by the solution. These films must also maintain a consistency during passage through the conveyor arranged in the dehydrating-/curing-solution bath and particularly during passage around the various return rollers. It is specified that the dehydrating/salting bath may be a brine bath.

In practice, the applicant selected a film that met all these constraints optimally. This film is made from paper and, more particularly, from baking parchment. It may also consist of any material allowing the diffusion of water, such as animal fibers (collagen), cellulose, polyethersulfane, etc.

As shown in FIG. 3, the dehydrating-/curing-solution bath is arranged with a brine-reinjection and recycling (7) circuit. It comprises, for this purpose, a reinjection pump (8) and sensors (9) for monitoring solute concentrations in the bath. An evaporation-concentration and measuring device (10) incorporated into said circuit makes it possible to readjust the concentration and composition of the solution.

The conveying device may be totally or partially immersed in the brine bath.

At the bath output, the continuous, drawn, ground-meat strip is conveyed to a device for cutting and removing the upper and lower films (4a–4b) in such a way as to reveal only the actual strip of ground meat thus processed. This is then conveyed to a cutting and packaging station (11) consisting in cutting said strip of ground meat-into portions (1c).

In this way, said portions are thin and are obtained in cutting configurations that correspond to the desired shapes to be obtained. The method according to the invention makes it possible to obtain portions up to a thickness of approximately 1 mm.

FIG. 2 shows several portions (1c) of ground meat that thus have an appearance that is totally different than the original one. Thus, according to the invention, the slices of ground meat offer a compact texture, and it is no longer detectable visually to identify the original configuration.

This novel method for converting ground meat into thin slabs offers many and significant points of interest and advantages.

Firstly, it allows the use of a variety of raw materials that are more or less noble depending on what is desired, enabling trimming and hard-muscle waste to be utilized.

It also makes it possible to obtain a product that is highly standardized in terms of appearance, shape, taste, and texture, and one that is tender and uniform. It allows the incorporation of ingredients that diffuse their characteristics throughout the meat handled in this way during processing.

The process can easily be implemented on an industrial scale, allowing rapid, continuous processing of this ground meat, with a conversion time that may be merely a few hours, particularly between two and five hours. Little manpower is required.

According to a further advantage, the films (4a–4b) have a triple function: they protect the meat, act as an interface for the solution by permitting the transmissibility of the solution's characteristics into the meat, and also act as conveyor throughout the method.

The shape of the slices of ground meat thus obtained may vary as a function of the cutting tool and be adapted to any possible packaging.

In addition to conventional rectangular shapes, the cutting tool allows more complex shapes to be obtained—rings, for example, triangles or the like—making it possible to lend innovation to marketing. The strip of meat may also be wound up on itself in order to form tubes or other shapes.

The ingredients and seasonings may be adapted, as a function of production lines, in terms of desired and variable quantities.

Without departing from the scope of the invention, the method applies to all meat-product-based compositions.

The invention claimed is:

1. Method for producing and converting ground meat, wherein the following seven stages are employed to continuously obtain ground, cured and dried meat in the form of thin strips comprising:

the first stage consists of fine chopping-up of noble meat, in a chopper;

the second stage consists, at the output of the chopper, of conveying the ground meat into a meat pump, to form a continuous tube or a continuous flattened strip;

the third stage consists of unwinding an upper film and a optional lower film from a corresponding upper device and lower device on which each film has been wound as a reel, wherein the unwound upper film and lower film form a sealing sheath around the continuous tube or strip of ground meat producing a sheathed ground-meat tube or strip;

the fourth stage consists of passing said sheathed ground-meat tube or strip into a rolling device for spreading the ground meat into a drawn ground-meat strip, in a thin layer, in a compacting and texturing configuration that does not reveal the meat parts themselves;

the fifth stage consists of continuously unwinding the drawn ground-meat strip from the rolling device into a dehydrating-/curing-solution bath;

the sixth stage consists, at the output of the solution bath, of removing the sheath-forming film from the drawn around-meat strip to form a thin, dried and rolled, ground-meat strip; and the seventh stage consists of conveying the thin, dried and rolled, ground-meat strip to a cutting and packaging station.

2. Method as claimed in claim 1, wherein before or after fine chopping-up of the meat, spices.

3. Method as claimed in claim 2, wherein the method applies to all meat-product-based compositions.

4. Method as claimed in claim 2, wherein the dehydrating-/curing-solution bath is a brine bath.

5. Method as claimed in claim 1, wherein the method applies to all meat-product-based compositions.

6. Method as claimed in claim 5, wherein the dehydrating-/curing-solution bath is a brine bath.

7. Method as claimed in claim 1, wherein the dehydrating-/curing-solution bath is a brine bath.

* * * * *

UNITED STATES PATENT AND TRADEMARK OFFICE
CERTIFICATE OF CORRECTION

PATENT NO.         : 7,090,881 B2
APPLICATION NO. : 10/756735
DATED                  : August 15, 2006
INVENTOR(S)        : Sirami et al.

It is certified that error appears in the above-identified patent and that said Letters Patent is hereby corrected as shown below:

Title Page #54
Title of Patent - Delete "METHOD OF" and add --METHOD FOR--

Title Page
Assignee's (73) name is misspelled: Delete "Development" and add --Developpment--

Title Page
Under "Related U.S. Application" - (63) the filing date is wrong: Delete "Jan. 7, 2002" and add --July 1, 2002--

Claim 1, Column 5, Line 14: Delete "optional"

Claim 1, Column 6, Line 6: Delete "around-meat" and add --ground-meat--

Claim 2, Column 6, Line 12: Delete "spices" and add --spices are added--

Claim 3, Column 6, Line 13: Delete "claim 2" and add --claim 1--

Claim 4, Column 6, Line 15: Delete "claim 2" and add --claim 1--

Claim 5, Column 6, Line 17: Delete "claim 1" and add --claim 2--

Claim 6, Column 6, Line 19: Delete "claim 5" and add --claim 2--

Claim 7, Column 6, Line 21: Delete "claim 1" and add --claim 3--

Signed and Sealed this

Ninth Day of January, 2007

JON W. DUDAS
*Director of the United States Patent and Trademark Office*